US011971686B2

(12) United States Patent
Marlot Doerr et al.

(10) Patent No.: US 11,971,686 B2
(45) Date of Patent: Apr. 30, 2024

(54) TIMEPIECE DIAL

(71) Applicant: The Swatch Group Research and Development Ltd, Marin (CH)

(72) Inventors: Agnès Marlot Doerr, Neuchâtel (CH); Nicolas François, Neuchâtel (CH); Alexandros Mouskeftaras, Marseilles (FR); Michel Willemin, Prêles (CH); Jean-Claude Martin, Montmollin (CH); Carole Govaerts, Les Bioux (CH)

(73) Assignee: The Swatch Group Research and Development Ltd, Marin (CH)

( * ) Notice: Subject to any disclaimer, the term of this patent is extended or adjusted under 35 U.S.C. 154(b) by 1051 days.

(21) Appl. No.: 16/686,392

(22) Filed: Nov. 18, 2019

(65) Prior Publication Data

US 2020/0201261 A1 Jun. 25, 2020

(30) Foreign Application Priority Data

Dec. 19, 2018 (EP) .................................... 18214225

(51) Int. Cl.

*G04B 45/00* (2006.01)
*G04B 19/10* (2006.01)
*G04B 19/12* (2006.01)

(52) U.S. Cl.

CPC ......... *G04B 45/0015* (2013.01); *G04B 19/10* (2013.01); *G04B 19/12* (2013.01)

(58) Field of Classification Search

CPC ..... G04B 19/12; G04B 19/10; G04B 45/0015
See application file for complete search history.

(56) References Cited

U.S. PATENT DOCUMENTS 2,885,561 A * 5/1959 Lange .................... G04B 19/32 968/215
3,851,460 A * 12/1974 Piquerez .............. G04G 9/0041 968/215

(Continued)

FOREIGN PATENT DOCUMENTS

CH 697 210 A5 6/2008
CH 713 785 B1 11/2018

(Continued)

OTHER PUBLICATIONS

Communication dated Dec. 29, 2020, from The China National Intellectual Property Administration in Application No. 201911293212.2.

(Continued)

*Primary Examiner* — Edwin A. Leon
*Assistant Examiner* — Jason M Collins
(74) *Attorney, Agent, or Firm* — Sughrue Mion, PLLC

(57) ABSTRACT

A dial, and timepiece including the dial, including a mother-of-pearl wafer partially covering a support member, and a decorative element arranged on a reverse of the wafer, the decorative element being visible on an obverse of the wafer when subjected to a stimulus and invisible on the obverse of the wafer in the absence of the stimulus. The decorative element has a first empty area on a reverse of the wafer, and a second empty area on the obverse of the wafer, facing the first empty area. A colour compensation layer is deposited on the first empty area or the second empty area, the colour being selected such that the difference in colour ΔE in the CIE Lab colour space between the colour compensation layer and the decorative element in the absence of said stimulus, perceived by a user observing the obverse of the wafer, is less than 3.

15 Claims, 1 Drawing Sheet

(56) References Cited

U.S. PATENT DOCUMENTS

| | | | |
|---|---|---|---|
| 6,512,721 | B1 | 1/2003 | Amano et al. |
| 7,499,380 | B2 | 3/2009 | Gouthier et al. |
| 2004/0196742 | A1 | 10/2004 | Gouthier et al. |

FOREIGN PATENT DOCUMENTS

| | | | |
|---|---|---|---|
| CN | 101663625 | A | 3/2010 |
| CN | 102947764 | A | 2/2013 |
| CN | 202837829 | U | 3/2013 |
| CN | 208110286 | U | 11/2018 |
| JP | H11-143414 | A | 5/1999 |
| JP | 2001249189 | A | 9/2001 |
| JP | 2002192900 | A | 7/2002 |
| JP | 2003162242 | A | 6/2003 |
| JP | 2006177957 | A | 7/2006 |
| JP | 2008-111732 | A | 5/2008 |
| JP | 2014-16394 | A | 1/2014 |
| JP | 2016-170399 | A | 9/2016 |

OTHER PUBLICATIONS

European Search Report for EP 18 21 4225 dated Jun. 18, 2019.
Communication dated Apr. 13, 2021, from Japanese Patent Office in application No. 2019223440.

* cited by examiner

TIMEPIECE DIAL

CROSS REFERENCE TO RELATED APPLICATIONS

This application claims priority to European Patent Application No. 18214225.7, filed on Dec. 19, 2018, the entire contents of which are incorporated herein by reference.

FIELD OF THE INVENTION

The invention relates to a dial comprising a support member, a mother-of-pearl wafer having an obverse and a reverse side and at least partially covering the support member, and at least one decorative element arranged on the reverse side, said decorative element being arranged to be visible on the obverse of the mother-of-pearl wafer when subjected to a stimulus and invisible on the obverse of the mother-of-pearl wafer in the absence of said stimulus, said decorative element defining around it, at least a first empty area on the reverse of the mother-of-pearl wafer and at least a second empty area on the obverse of the mother-of-pearl wafer, facing the first empty area. The present invention also concerns a timepiece including such a dial.

BACKGROUND OF THE INVENTION

The use of mother-of-pearl for manufacturing dials is already known in the watch industry for its particular aesthetics. Mother-of-pearl has a biological origin, iridescent reflections and a translucency that make each piece of mother-of-pearl unique. Depending on where it comes from, mother-of-pearl can have various inherent colours (e.g. white, grey, pink, green). In order to change its aesthetics, mother-of-pearl can be dyed by soaking in a dye bath. A decoration can also be applied to the obverse (the side seen by a user of the timepiece) or the reverse (the back side, facing the inside of the timepiece) of the mother-of-pearl, this latter option relying on the translucent properties of the material. The visible decoration can be formed of a coloured lacquer or a metal deposition. The lacquer can be applied by techniques usually used for lacquer, such as spray coating, pad printing or silk screen printing. A metal deposition can also be applied by physical vapour-phase deposition techniques such as PVD. Other inorganic layers, such as, for example, nitrides, carbides or oxides can be applied by PVD or CVD.

Depending on its thickness on the obverse of the part, the decoration can even cover and conceal the particular morphology of the mother-of-pearl. In these techniques, the decoration, even when placed on the back of the mother-of-pearl dial, is still visible in the final timepiece.

European Patent document No. EP 167243 mentions, for example, the manufacture of a mother-of-pearl dial with a uniform metallic appearance by depositing a metal coating over the entire obverse surface of the dial.

Swiss Patent document No. CH559924 discloses a dial comprising a mother-of-pearl-of-pearl wafer underneath which there are arranged elements made of luminescent material, which are visible at night and invisible in the day so that they cannot be detected by the eye through the mother-of-pearl wafer. In this document, the luminescent material is applied in a uniform manner to the reverse of the part and does not allow a complex decoration to appear on the obverse of the mother-of-pearl.

Swiss Patent document No. CH697210 discloses a dial comprising a mother-of-pearl wafer whose back face includes cavities filled with phosphorescent pigments, which allow a decoration to appear under the mother-of-pearl, visible in the dark, whose design and luminous intensity can be selected according to the shape and depth of the cavities. However, the luminous intensity of the decoration in the dark must be limited to ensure that the phosphorescent pigments on the obverse of the part are invisible when the dial is exposed to daylight.

SUMMARY OF THE INVENTION

It is an object of the present invention to overcome these drawbacks by proposing a mother-of-pearl timepiece dial, comprising a decoration on the reverse of the part and in which the decoration only becomes visible on the obverse of the part when subjected to an external or internal, light, electrical or physical stimulus, wherein the invisibility of said decoration on the obverse of the part, when not subjected to the stimulus, is improved.

It is also an object of the present invention to propose a mother-of-pearl timepiece dial comprising several decorations on the reverse of the part, which are visible on the obverse of the part with different luminous intensities when subjected to their stimulus, all the decorations being invisible on the obverse of the part when they are not subjected to their stimulus.

To this end, the invention relates to a dial comprising a support member, a mother-of-pearl wafer having an obverse and a reverse side and at least partially covering the support member, and at least one decorative element arranged on the reverse of said mother-of-pearl wafer, said decorative element being arranged to be visible on the obverse of the mother-of-pearl wafer when subjected to a stimulus and invisible on the obverse of the mother-of-pearl wafer in the absence of said stimulus, said decorative element defining around it, at least a first empty area on the reverse of the mother-of-pearl wafer and at least a second empty area on the obverse of the mother-of-pearl wafer, facing the first empty area.

According to the invention, the dial includes at least one colour compensation layer deposited on at least one of the first and second empty areas, the colour of said colour compensation layer being selected such that the difference in colour $\Delta E$ in the CIE Lab colour space between the colour of the colour compensation layer and the colour of the decorative element in the absence of said stimulus, perceived by a user looking at the obverse of the mother-of-pearl wafer, is less than 3 and preferably less than or equal to 1.

Thus, as a result of the colour compensation layer, the invisibility of the decoration on the obverse of the part when it is not subjected to its stimulus, is improved. It is then possible to use a decoration of higher luminous intensity when it is subjected to its stimulus, or several decorations giving different luminous intensities, some of which could be high, with any risk of seeing said decoration(s) appear on the obverse of the part when the stimulus is not applied.

The present invention also concerns a timepiece including such a dial.

BRIEF DESCRIPTION OF THE DRAWINGS

Other features and advantages of the invention will appear more clearly upon reading the following description of different embodiments of the invention, given simply by way of illustrative and non-limiting examples, and the annexed Figures, among which.

DETAILED DESCRIPTION OF PREFERRED EMBODIMENTS

Figure 1:
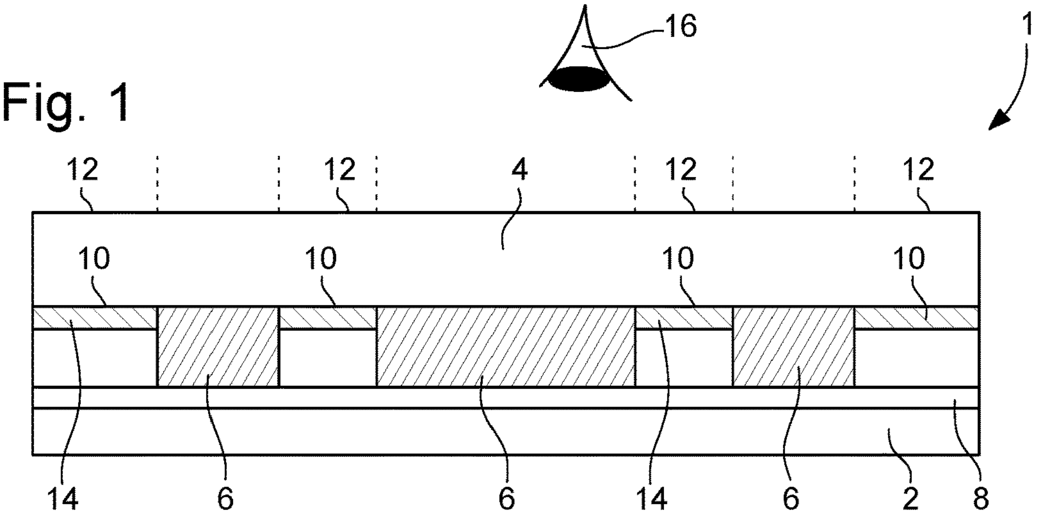
FIGS. 1 to 3 are schematic views of various embodiments of a dial according to the present invention.

The present invention concerns a timepiece dial comprising a support member, a mother-of-pearl wafer having an obverse and a reverse side and at least partially covering the support member, and at least one decorative element arranged on the reverse side of said mother-of-pearl wafer, The support member is preferably metal. It may be made of brass, yellow or white gold, or silver, or any other suitable metal. It can be assembled to the mother-of-pearl wafer bearing the decorative element by plating, adhesive bonding or any other suitable means.

The decorative element is arranged to be visible on the obverse of the mother-of-pearl wafer when subjected to a stimulus and invisible on the obverse of the mother-of-pearl wafer in the absence of said stimulus.

The decorative element defines around it, on the reverse of the mother-of-pearl wafer, at least a first empty area, i.e. an area of the reverse of the mother-of-pearl wafer unoccupied by said decorative element. The decorative element also defines, by projection onto the obverse of the mother-of-pearl wafer, facing the first empty area, at least a second empty area, i.e. an area of the obverse of the mother-of-pearl through which said decorative element, on the reverse side, does not appear.

According to the invention, the dial includes at least one colour compensation layer deposited on at least one of the first and second empty areas. the colour of said colour compensation layer being selected such that the difference in colour ΔE in the CIE Lab colour space between the colours of the colour compensation layer and of the decorative element in the absence of said stimulus, perceived by a user looking at the obverse of the mother-of-pearl wafer, is less than 3 and preferably less than or equal to 1.

The colour difference ΔE in the CIE Lab colour space is defined as a measurement of the difference between two colours by the equation (I):

$$\Delta E^* = \sqrt{(L_2^* = L_1^*)^2 + (a_2^* - a_1^*)^2 + (b_2^* - b_1^*)^2} \quad \text{(I)}$$

$L_1^*$, $a_1^*$, $b_1^*$ are the coordinates in the CIE Lab colour space of the first colour to be compared and $L_2^*$, $a_2^*$, $b_2^*$ are the coordinates in the CIE Lab colour space of the second colour to be compared.

The decorative element includes particles reactive to the stimulus, namely phosphorescent or photochromic particles for sensitivity to a light stimulus, electrochromic particles for sensitivity to an electrical stimulus, or thermochromic particles for sensitivity to a temperature variation.

Preferably, the decorative element is obtained from a lacquer or a reactive ink containing an epoxy or polyurethane binder, to which the reactive particles are added. The size of the reactive particles may be comprised between 0.5 μm and 100 μm, and preferably between 10 μm and 50 μm. Inorganic or organic additives can be used to change the shade of the reactive lacquer and achieve the desired colour if necessary, or its texture or optical properties. The shade of the lacquer or of the reactive ink is chosen such that the decorative element, when not subjected to its stimulus, changes the inherent appearance of the mother-of-pearl wafer as little as possible, and becomes completely invisible on the obverse of the dial by means of the colour compensation layer.

The decorative element is arranged between the support member and the mother-of-pearl wafer. To this end, the decorative element can be formed on the reverse of the mother-of-pearl wafer, either directly on the reverse surface of the mother-of-pearl, or in at least one blind cavity formed from the reverse side of the mother-of-pearl and arranged to receive said decorative element.

Advantageously, the reverse of the mother-of-pearl wafer can comprise several blind cavities to form several decorative elements.

Said blind cavities are formed from the reverse of the mother-of-pearl wafer by laser, mechanical or manual etching to create blind cavities whose geometry and depth are defined according to the decorative element to be represented and according to the intensity of the decorative element that will appear through the mother-of-pearl wafer when subjected to its stimulus. The blind cavities are then selectively filled with the reactive lacquer. The blind cavities allow a larger quantity of reactive lacquer to be used, which increases the intensity of optical phenomena. Further, advantageously, the blind cavities have different depths to form several decorative elements which, when subjected to the stimulus, will appear with an intensity that varies between the different decorative elements, creating contrasting colours.

The decorative element can also be disposed on the support member which will then be placed against the reverse of the mother-of-pearl, by plating, adhesive bonding for example.

The lacquer or reactive ink is selectively applied to create a decoration on the reverse of the mother-of-pearl wafer or the support member. Processes that can be implemented for this purpose are lacquering or spray coating using a mask or a photosensitive lacquer to selectively deposit the lacquer, by selective laser or mechanical ablation of the lacquer, silk screen printing, pad printing or any other suitable printing technique.

The composition and thickness of the colour compensation layer used in the present invention are adapted according to the composition of the lacquer or reactive ink, the thickness of the mother-of-pearl wafer and its colour, in order to obtain a compensation layer whose colour can satisfy equation (I).

The colour compensation layer can be organic in nature, such as a varnish containing pigments or dyes to obtain the colour required to satisfy equation (I).

The colour compensation layer can be inorganic in nature, for example based on oxides or nitrides, for example of zirconium or of titanium, or based on metals such as, for example, aluminium, silver or alloyed gold having the colour required to satisfy equation (I).

Advantageously, the compensation layer is transparent, in particular when the compensation layer is applied to the obverse of the mother-of-pearl wafer.

Further, the colour compensation layer deposited on the first empty layer can also be metallic, inherently having the colour required to satisfy equation (I).

The colour compensation layer can be applied by spray coating, dip coating, pad printing, silk screen printing, sol-gel coating, printing or by vacuum techniques such as PVD.

According to a variant of the invention, the surface of at least one of the first and second empty areas may be diffusive. The diffusive surface can be created on the reverse and/or obverse of the mother-of-pearl wafer by chemical, laser or mechanical etching. Another variant is the use of a diffusive film applied to the surface of the mother-of-pearl, preferably on the obverse of the mother-of-pearl wafer.

According to a first embodiment of the invention represented in FIG. 1, dial 1 includes a support member 2, a mother-of-pearl wafer 4 having an obverse and a reverse side and several decorative elements 6 arranged directly on the reverse of mother-of-pearl wafer 4 to form an image that appears through the obverse of mother-of-pearl wafer 4 when decorative elements 6 are subjected to their stimulus. Mother-of-pearl wafer 4 and decorative elements 6 are assembled on support member 2 by means of an adhesive layer 8. Decorative elements 6 define around them, first empty areas 10 on the reverse of mother-of-pearl wafer 4, and, on the obverse of mother-of-pearl wafer 4, facing first empty areas 10, second empty areas 12.

In this embodiment, colour compensation layer 14 according to the invention is arranged on the reverse of mother-of-pearl wafer 4 only on first empty areas 10 around decorative elements 6. Thus, as a result of colour compensation layer 14 according to the invention, a user 16 looking at the obverse of mother-of-pearl wafer 4 does not perceive the colour difference between the colour, through mother-of-pearl wafer 4, of the decorative elements 6 not subjected to their stimulus and the colour of colour compensation layer 14 deposited in first empty areas 10 which appears through second empty areas 12. The decorative elements 6 not subjected to their stimulus are completely invisible.

When subjected to their stimulus, the colour of the decorative elements changes so that they become visible on the obverse of the dial, through the mother-of-pearl wafer, with respect to the colour compensation layer which is then not operating.

Figure 2:
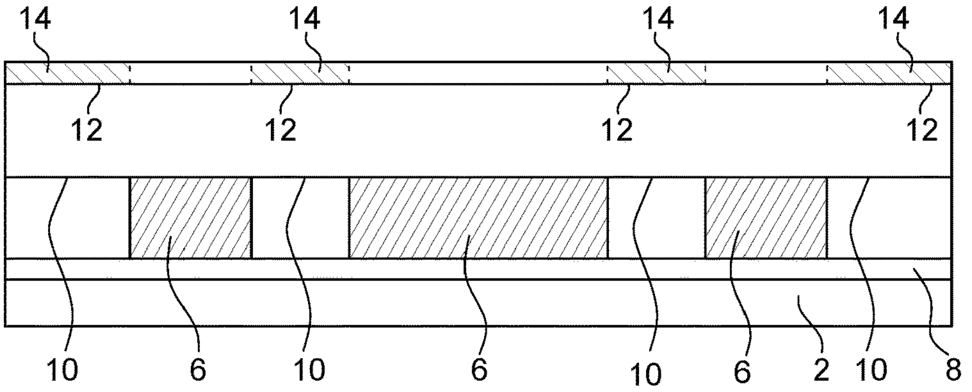

According to another embodiment represented in FIG. 2, colour compensation layer 14 is arranged on the obverse of the mother-of-pearl wafer only on second empty areas 12 facing first empty areas 10. As in the preceding variant, mother-of-pearl wafer 4 and decorative elements 6 are assembled on support member 2 by an adhesive layer 8.

Thus, as a result of colour compensation layer 14 according to the invention, a user 16 looking at the obverse of mother-of-pearl wafer 4 does not perceive the colour difference between the colour, through mother-of-pearl wafer 4, of the decorative elements 6 not subjected to their stimulus and the colour of colour compensation layer 14 deposited on second empty areas 12. The decorative elements 6 not subjected to their stimulus are completely invisible.

When subjected to their stimulus, the colour of the decorative elements changes so that they become visible on the obverse of the dial, through the mother-of-pearl wafer, with respect to the colour compensation layer which is then not operating.

Figure 3:
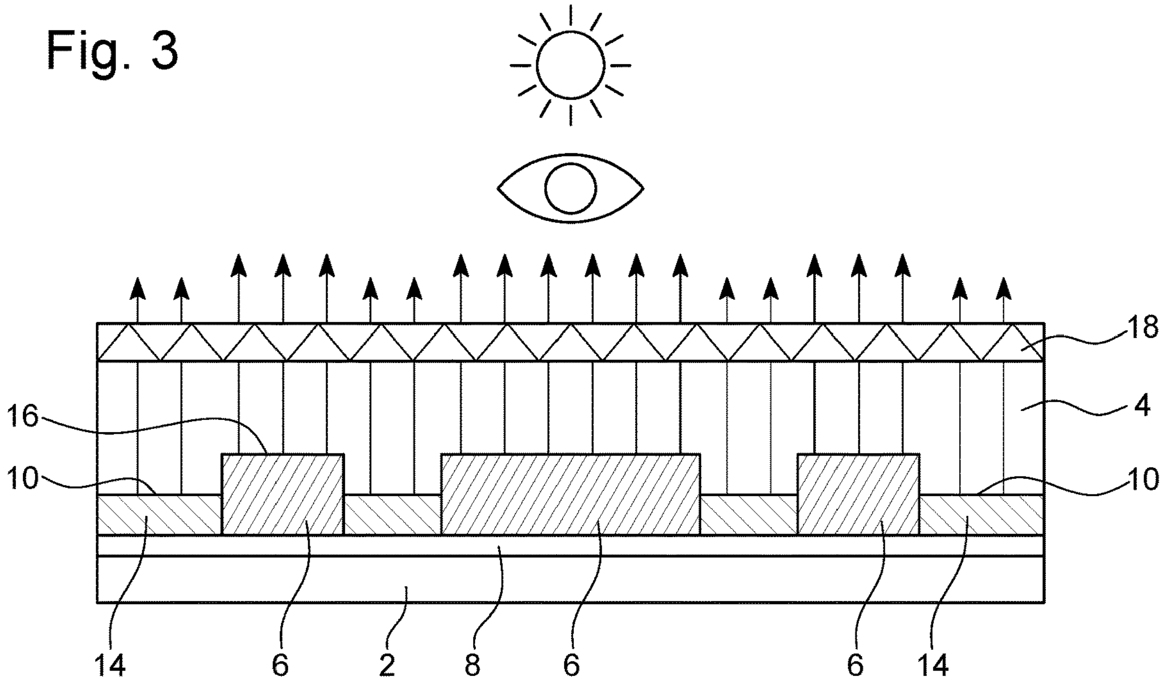

According to another embodiment represented in FIG. 3, the reverse of mother-of-pearl wafer 4 comprises blind cavities 16 filled with reactive lacquer to form decorative elements 6.

In this embodiment, colour compensation layer 14 according to the invention is arranged on the reverse of mother-of-pearl wafer 4 only on first empty areas 10 around decorative elements 6, as in the embodiment of FIG. 1.

According to another variant of the invention, the obverse of mother-of-pearl wafer 4 can also comprise a diffusive surface 18 over the entire surface or only on the surface of second empty areas 12 facing first empty areas 10 occupied by colour compensation layer 14 or only on the surface facing decorative elements 6.

Thus, as a result of the colour compensation layer, the invisibility of the decoration on the obverse of the part when it is not subjected to its stimulus, is improved. It is thus possible to use a decoration of higher luminous intensity when it is subjected to its stimulus, or several decorations giving different luminous intensities, some of which could be high, with any risk of seeing said decoration(s) appear on the obverse of the part when the stimulus is not applied.

The invention claimed is:

1. A dial comprising a support member, a mother-of-pearl wafer having an obverse side and a reverse side and at least partially covering the support member, and at least one decorative element arranged on the reverse side of said mother-of-pearl wafer, said decorative element being arranged to be visible on the obverse side of the mother-of-pearl wafer when subjected to a stimulus and invisible on the obverse side of the mother-of-pearl wafer in the absence of said stimulus, said decorative element defining around it, at least a first empty area on the reverse side of the mother-of-pearl wafer, and at least a second empty area on the obverse side of the mother-of-pearl wafer, facing said first empty area, wherein said dial comprises at least one colour compensation layer deposited on at least one of the first empty area and second empty area, the colour of said colour compensation layer being selected such that the difference in colour ΔE in the CIE Lab colour space between the colour compensation layer and the decorative element in the absence of said stimulus, perceived by a user looking at the obverse side of the mother-of-pearl wafer, is less than 3, and wherein the surface of the compensation layer in contact with the support member is coplanar with the surface of the decorative element in contact with the support member, wherein the decorative element is in direct contact with the mother of pearl wafer, and wherein the decorative element is closer to the support member than is the mother of pearl wafer.

2. The dial according to claim 1, characterized in that the colour compensation layer is arranged on the reverse side of the mother-of-pearl wafer only on the first empty area around the decorative element.

3. The dial according to claim 1, characterized in that the colour compensation layer is arranged over an entirety of the reverse side of the mother-of-pearl wafer.

4. The dial according to claim 1, characterized in that the colour compensation layer is arranged only on the second empty area.

5. The dial according to claim 1, characterized in that the colour compensation layer is arranged over an entirety of the obverse side of the mother-of-pearl wafer.

6. The dial according to claim 1, characterized in that the colour compensation layer is of organic or inorganic nature, or a combination of both.

7. The dial according to claim 6, characterized in that the colour compensation layer deposited on the first empty area is metal.

8. The dial according to claim 1, characterized in that the surface of at least one of the first and second empty areas is diffusive, said at least one of the surfaces being arranged on the obverse side or the reverse side.

9. The dial according to claim 1, characterized in that the reverse of the mother-of-pearl wafer includes at least one blind cavity receiving the decorative element.

10. The dial according to claim 9, characterized in that the reverse side of the mother-of-pearl wafer includes blind cavities in order to receive several decorative elements which, when subjected to stimulus, appear with different intensities.

11. The dial according to claim 1, characterized in that the decorative element is disposed on the support member.

12. The dial according to claim 11, characterized in that the dial has an etch on the reverse side.

13. The dial according to claim 1, characterized in that the decorative element includes phosphorescent or photochromic particles for sensitivity to a light stimulus, electrochromic particles for sensitivity to an electrical stimulus, or thermochromic particles for sensitivity to a temperature variation.

14. The dial according to claim 1, wherein the difference is less than or equal to 1.

15. Timepiece comprising a dial comprising a support member, a mother-of-pearl wafer having an obverse side and a reverse side and at least partially covering the support member, and at least one decorative element arranged on the reverse side of said mother-of-pearl wafer, said decorative element being arranged to be visible on the obverse side of the mother-of-pearl wafer when subjected to a stimulus and invisible on the obverse side of the mother-of-pearl wafer in the absence of said stimulus, said decorative element defining around it, at least a first empty area on the reverse side of the mother-of-pearl wafer, and at least a second empty area on the obverse side of the mother-of-pearl wafer, facing said first empty area, wherein said dial comprises at least one colour compensation layer deposited on at least one of the first empty area and second empty area, the colour of said colour compensation layer being selected such that the difference in colour ΔE in the CIE Lab colour space between the colour compensation layer and the decorative element in the absence of said stimulus, perceived by a user looking at the obverse side of the mother-of-pearl wafer, is less than 3, and wherein the surface of the compensation layer in contact with the support member is coplanar with the surface of the decorative element in contact with the support member, wherein the decorative element is in direct contact with the mother of pearl wafer, and wherein the decorative element is closer to the support member than is the mother of pearl wafer.

* * * * *